Patented Oct. 8, 1946

2,408,827

UNITED STATES PATENT OFFICE 2,408,827

STEROIDAL COMPOUNDS AND METHODS FOR OBTAINING THE SAME

Romeo B. Wagner, State College, Pa., assignor to Parke, Davis & Company, Detroit, Mich., a corporation of Michigan No Drawing. Application May 15, 1944, Serial No. 535,748

4 Claims. (Cl. 260—239.5)

The invention relates to new steroidal sapogenin type compounds and derivatives thereof and methods for obtaining the same. It includes new steroidal sapogenin compounds of the general formula:

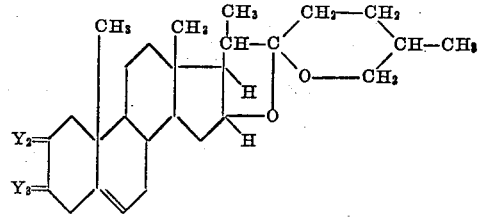

where $Y_2$ and $Y_3$ represent

and groups hydrolyzable to

I have found that by treating certain plants, such as various species of Yucca, by chemical and physical methods, one can obtain new and valuable steroidal sapogenin compounds and their derivatives.

I have found that by treating certain plants such as various species of Yucca, by chemical and physical methods, a new and valuable steroidal compound is obtained which has been named Yuccagenin and has the following structural formula:

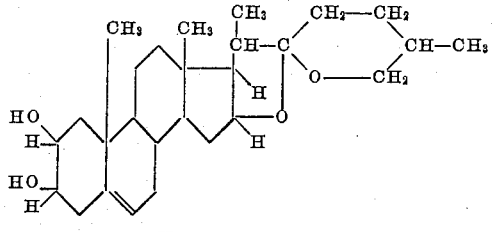

Yuccagenin ($C_{27}H_{42}O_4$)

Yuccagenin may also be converted into its diacylates, of which the diacetate has the following formula:

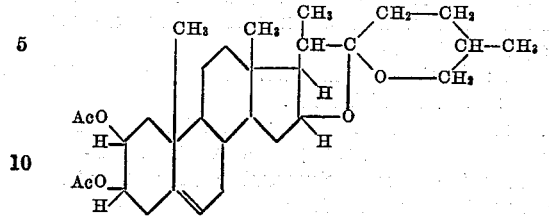

Yuccagenin diacetate ($C_{31}H_{46}O_6$)

These new compounds are useful as intermediates for preparation of physiologically active compounds, such as sex hormones. In general, I first treat the plant source by solvent extraction and hydrolytic procedures combined with fractional crystallizations. The following examples show how to get the new products.

*Example 1*

4 kilograms of broken up caudex and roots of Yucca elata Engelm. collected near Tucson, Arizona, in the month of December are extracted with hot water or a lower aliphatic alcohol such as hot 95% ethyl alcohol and then the solvent is evaporated to leave a syrupy residue. The saponin-containing residue is then hydrolyzed, for example by refluxing it a few hours with 2 N ethanolic hydrochloric acid, cooling and filtering. The filtrate is diluted with several volumes of diethyl ether and the solution washed successively with water, 5% sodium hydroxide solution and water. Solvent is then evaporated away. Any fatty esters in the residue can be hydrolyzed by refluxing it with a few volumes of 10% alcoholic KOH for about ½ hour. The cooled mixture from the alkaline hydrolysis is extracted with ether and the ethereal solution washed with water and then evaporated to give a sapogenin fraction which is dissolved in acetone, the solution treated with active charcoal and filtered.

3

The acetone filtrate is concentrated and cooled to give a tan solid weighing 8.5 grams and melting at 172–174° C. After two crystallizations from ether, it melts at 185 to 186° C. Two more crystallizations from methanol raise the melting point to 191–192° C. Two final crystallizations from ether give plates, M. P. and mixed M. P. with sarsasapogenin, 199–200°; wt. is 0.5 g. This sarsasapogenin product can be refluxed with acetic anhydride and the mixture cooled and filtered to give an acetate identical with sarsasapogenin acetate, M. P. and mixed M. P. 128–130° C.

All of the mother liquors from the crystallization of sarsasapogenin are combined and evaporated. The residue is treated with 10% alcoholic KOH for 30 minutes. The reaction mixture is cooled and extracted with ether. The ethereal solution, after washing with water, is concentrated to 50 cc. After standing overnight at 0° C., crystals separate out. These are separated, taken up in ether and recrystallized therefrom to give a product of M. P. 220–235° C. This product is acetylated with boiling acetic acid anhydride for 30 minutes, excess anhydride separated from the acetylated product and the latter taken up in and crystallized from methanol as white needles of yuccagenin diacetate having a melting point of 175 to 177° C.

Anal.: Calc'd for $C_{31}H_{46}O_6$: C, 72.3; H, 9.0%. Found: C, 72.4; H, 9.0%.

This diacetate is hydrolyzed with 10% alcoholic KOH, the reaction mixture cooled and extracted with ether and pure yuccagenin crystallized from ether as white needles having a melting point of 244–246° C.

Anal.: Calc'd for $C_{27}H_{42}O_4$: C, 75.3%; H, 9.8%. Found: C, 75.5%; H, 9.6%.

When yuccagenin is crystallized from methanol it occurs as white plates of M. P. 250–252° C. This is a form polymorphic with the other form melting at 244–246° C.

*Example 2*

Yuccagenin readily decolorized an acetic acid solution of bromine.

An alcoholic solution of yuccagenin when added to a 2% alcoholic solution of digitonin forms a flocculent precipitate. Catalytic hydrogenation of yuccagenin diacetate (Adams catalyst; $H_2$ and $PtO_2$) in ether containing several drops of acetic acid followed by hydrolysis of the reduced acetate and extraction with and crystallization from ether gives gitogenin, M. P. and mixed M. P. 268–272° C.

Anal.: Calc'd for gitogenin, $C_{27}H_{44}O_4$: C, 75.0%; H, 10.3%. Found: C, 74.7; H, 10.0%.

This reduction shows that yuccagenin differs from gitogenin in possessing a double bond. The location of the double bond is established by

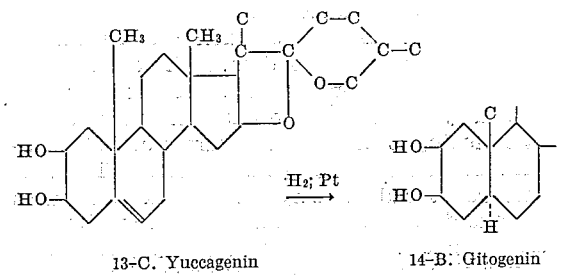

13-C. Yuccagenin    14-B. Gitogenin the formation of chlorogenonic acid (17-A) from

4 yuccagenin by a method somewhat like that employed for diosgenin, Marker, Jones and Turner, J. Am. Chem. Soc., 62, 2537 (1940), and cholesterol, Criegee, Ber., 65, 1720 (1933), Pichard and Yates, J. Chem. Soc., 93, 1678 (1908), Westphalen, Ber., 48, 1064 (1915), Windaus, Ber., 39, 2249 (1906), Windaus, Ber., 40, 257 (1907). The yuccagenin conversion is illustrated by the route, 13-C—15-B—16-A—17-A. The reaction of yuccagenin (13-C) with hydrogen peroxide in acetic acid forms the 2, 3, 5,6-tetrol (15-B). The latter with boiling acetic anhydride forms a triacetate. This might be expected if the double bond is at 5–6 since the 5-hydroxyl is tertiary and does not react. By analogy, diosgenin upon like treatment forms the 3,5,6-triol which makes a diacetate, Tsukamoto, Ueno, Ohta and Tschesche, Ber., 57, 283 (1937). Oxidation of the tetrol (15-B) with cold chromic acid gives a monobasic acid (16-A) having the composition $C_{27}H_{38}O_7$. The 3-carboxyl group has probably lactonized with the 5-hydroxyl since the usual dehydration treatment employed for a 3,6-diketo-5-ol gives unchanged material. Treatment of this product (16-A)

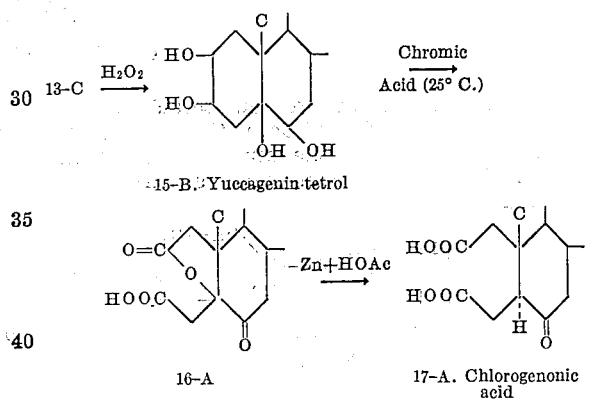

16-A    17-A. Chlorogenonic acid with zinc in acetic acid, however, gives a keto-diacid identical with chlorogenonic acid (17-A). The identity is further established by a direct comparison of the dimethyl esters. The conditions of the zinc-acetic acid reaction used here follow those employed for the reduction of the enedione obtained from diosgenin to chlorogenone.

By using the 5–6 double bond to good advantage, yuccagenin can be converted to 7-ketogitogenic acid (30-E). This series of reaction, viz. 13-C→25-D→26-D→27-D→28-E→29-E→30-E, follows essentially that used for converting diosgenin to 7-ketotigogenin acetate. Thus, yuccagenin diacetate reacts with twice the molecular quantity of bromine in acetic acid to give 5,6;23-tribromoyuccagenin diacetate (25-D). The 5,6-double bond is regenerated by treatment with potassium iodide in ethanol. In this manner, a bromine atom has been placed in the side-chain, thus protecting the latter from too great oxidation in the next step. By using conditions developed by Windaus, Lettre and Schwenck, Ann., 520, 98 (1935), for the preparation of 7-keto-compounds, 23 - bromoyuccagenin diacetate (26-D) can be converted to 7-keto-23-bromoyuccagenin diacetate (27-D). The double bond in the latter (27-D) is selectively hydrogenated using palladium-barium sulphate catalyst, resulting in the formation of 7-keto-23-bromogitogenin diacetate (28–E). Debromination of this substance (28–E) with zinc in acetic acid

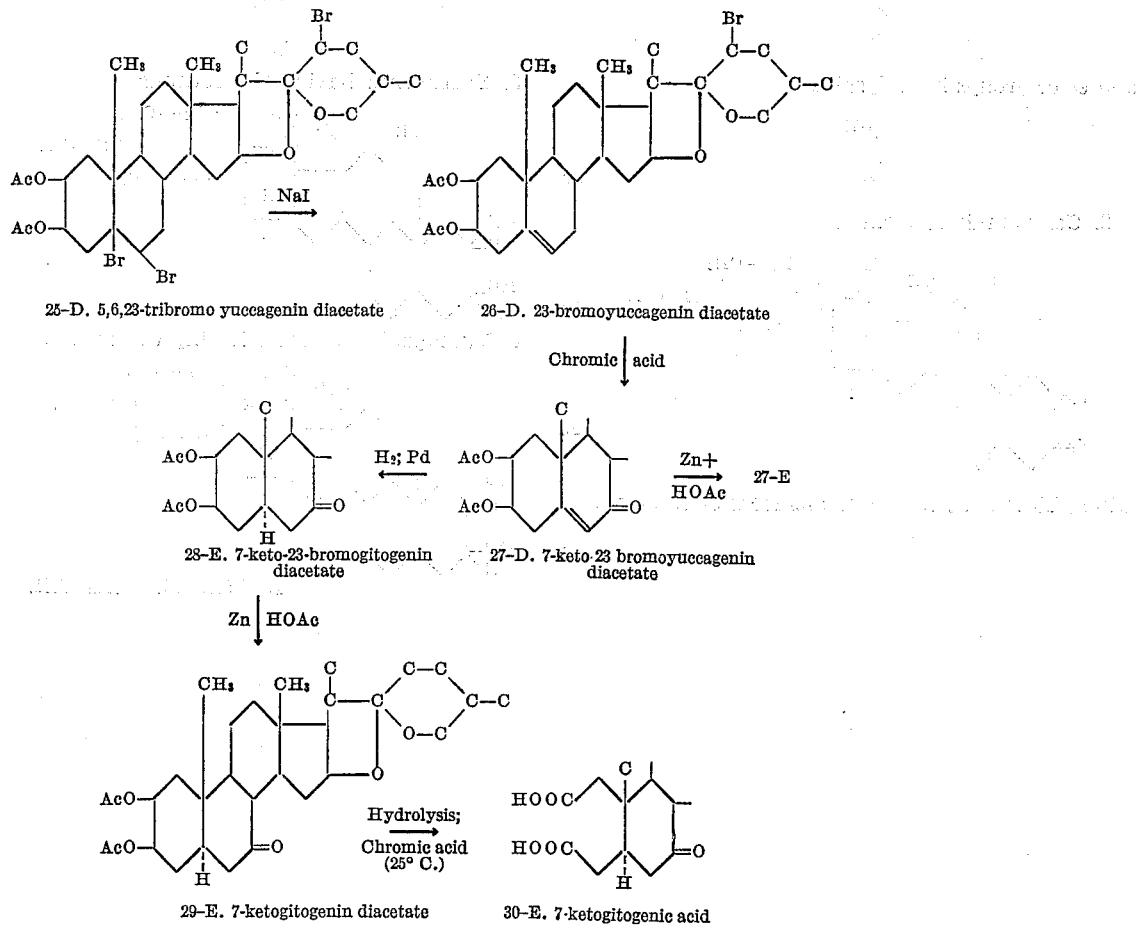

leaves the carbonyl group intact to give 7-ketogitogenin diacetate (29–E). The presence of the carbonyl group in 29–E has been ascertained by its formation of a 2,4-dinitrophenylhydrazone. Its removal by the Wolff-Kishner method gives gitogenin, proving that the basic structure of 29–E has not been altered. Hydrolysis of the keto-diacetate (29–E) followed by mild chromic acid oxidation gives 7-ketogitogenic acid (30–E). This compound is entirely different from digitogenic acid and digitoic acid. The non-identity is further established by their dimethyl esters.

Yuccagenin can be converted to a pseudo-sapogenin which is reconverted to the original sapogenin when treated with acid. The pseudo-compound after oxidation and subsequent hydrolysis is converted to 5,16-pregnadien-2,3($\beta$)-diol-20-one. Other than having a C-2 hydroxyl group, this pregnene compound is identical with 5,16-pregnadien-3($\beta$)-ol-20-one. The absorption curves bear out this close relationship. Selective hydrogenation of the 16-double bond using 3% palladium-barium sulphate catalyst gives 5-pregnen-2,3($\beta$)-diol-20-one. Additional support for the structure of pseudoyuccagenin triacetate is given by its conversion to the triacetate of dihydro-pseudo-gitogenin.

Catalytic hydrogenation of yuccagenin (13–C) under the conditions used for the formation of the dihydrosapogenins gives dihydrogitogenin.

The examples are for illustration and can be varied in a good many ways. For instance, acetic anhydride is used as an acylating agent for the alcoholic hydroxyl groups of yuccagenin. However, one can use any of the known agents for converting the alcoholic hydroxyls at C-2 and C-3 into ester or ether or other groups capable of hydrolysis to give hydroxyl. Such agents are, for example, organic acid halides, acetyl chloride, benzoyl chloride, furoyl chloride, butyric anhydride or similar lower fatty acid anhydride, etc. One can also treat yuccagenin with an alkali metal to form an alkali metal alcoholate and then react the latter with an alkyl halide to get an ether of yuccagenin. Triphenylmethyl chloride also reacts with yuccagenin to form a so-called trityl ether. Halides such as sulfuryl chloride, phosphorus chloride and the like can also be used in replacing the OH groups of yuccagenin by groups hydrolyzable to OH. Both hydroxyls can be esterified or etherified and the product then partially hydrolyzed to give one free hydroxyl while the other is in the form of a group hydrolyzable to give OH. Conversely, by carefully controlling the conditions, one can only partially esterify yuccagenin at one of its hydroxyls while leaving the other OH free.

What I claim is:

1. Compounds of formula,

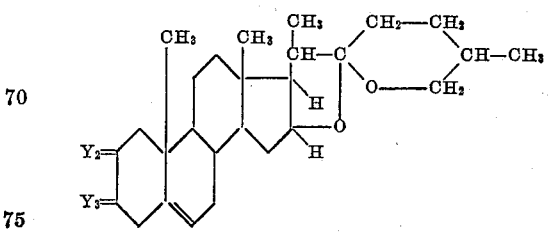

where $Y_2$ and $Y_3$ represent members of the class
and ester groups hydrolyzable to
2. Compounds of formula,
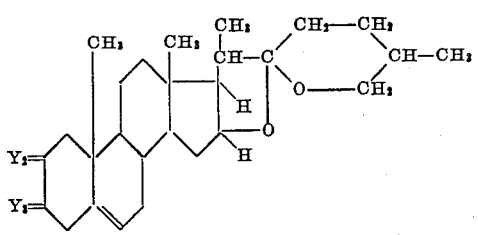
where $Y_2$ and $Y_3$ represent members of the class
and organic carboxylic acid ester groups hydrolyzable to
$$\begin{matrix} OH \\ H \end{matrix}$$
3. Yuccagenin having the formula
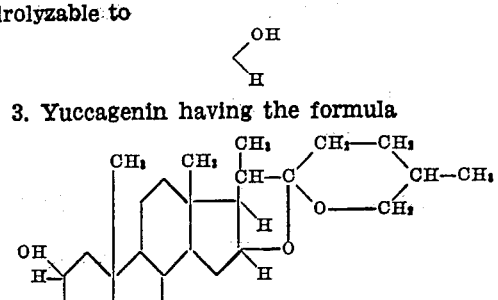
4. Yuccagenin diacetate having the formula
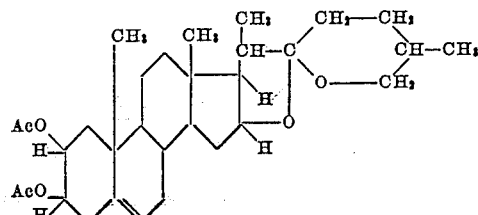
ROMEO B. WAGNER.